UNITED STATES PATENT OFFICE.

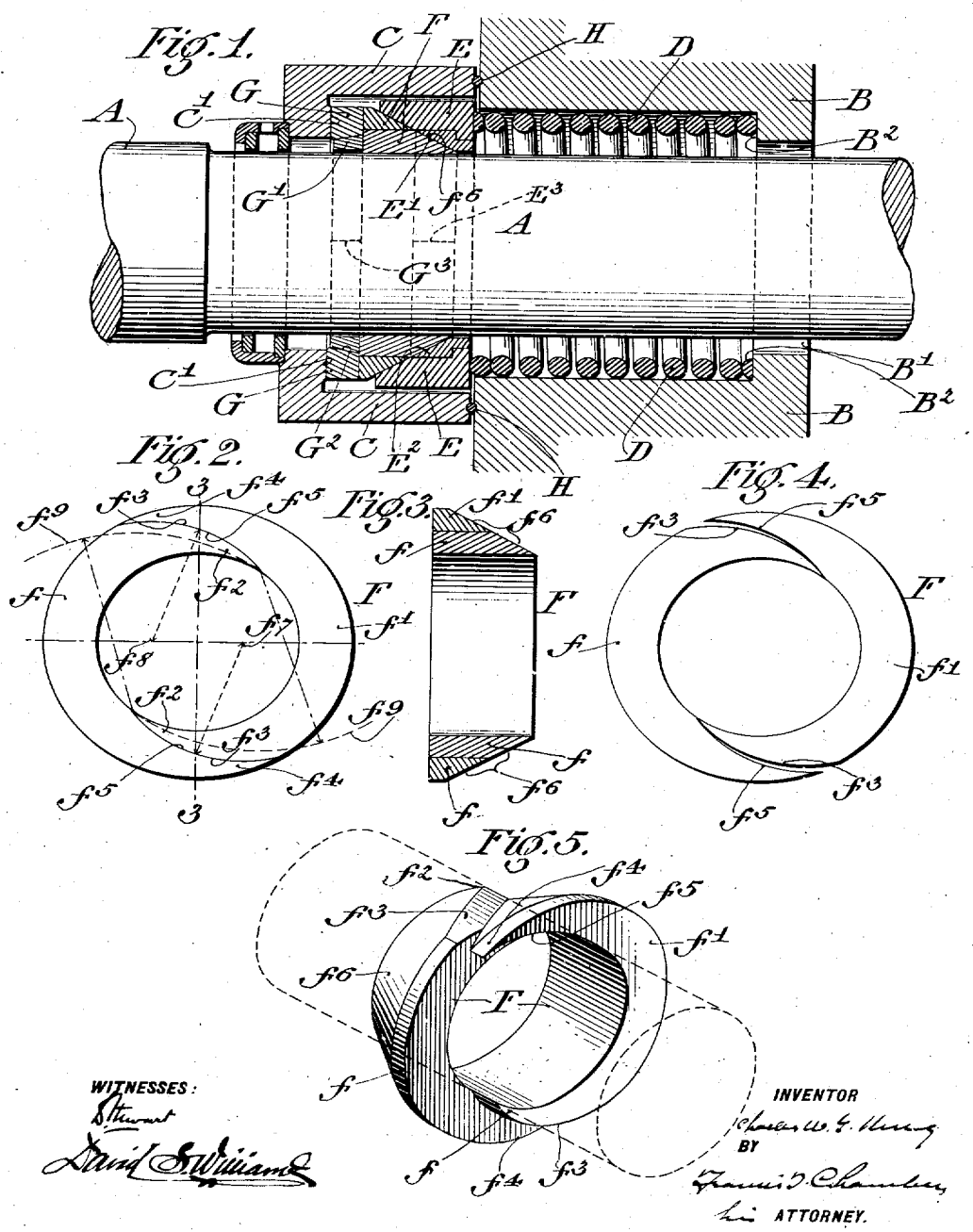

CHARLES W. G. KING, OF PHILADELPHIA, PENNSYLVANIA, ASSIGNOR TO UNITED STATES METALLIC PACKING COMPANY, OF CAMDEN, NEW JERSEY, A CORPORATION OF NEW JERSEY.

METALLIC ROD-PACKING RING.

No. 914,426.  Specification of Letters Patent.  Patented March 9, 1909.

Application filed December 7, 1908. Serial No. 466,216.

*To all whom it may concern:*

Be it known that I, CHARLES W. G. KING, a citizen of the United States of America, residing in the city and county of Philadelphia, in the State of Pennsylvania, have invented certain new and useful Improvements in Metallic Rod - Packing Rings, of which the following is a true and exact description, reference being had to the accompanying drawings, which form a part thereof.

The present invention relates to packing for rods, such as the piston rods of steam engines or the like, used to prevent the flow of steam or other fluid along a rod which is movable through a wall opening when the pressure at one side of the wall is higher than the pressure at the other side.

The object of the present invention is to provide a packing which will be effective in preventing the flow of fluid along the rod and will be simple in construction and composed of a relatively small number of parts and which can be readily assembled and disassembled.

A particularly important feature of the invention is the formation of a soft metal packing ring in two parts, so shaped that the ring can contract readily to compensate for the wear of the rod or packing ring and thereby maintain a tight joint, while at the same time the parts interlock with each other and the rod, when assembled on the rod, in such manner as to prevent a lateral movement of either segment away from the rod, while at the same time each segment of the ring may be laterally moved on to or off the rod when disengaged from the other segment and the two segments when on the rod can be assembled together in the interlocking or normal position or disassembled by moving one segment relative to the other in a direction parallel to the axis of the rod. This I accomplish by the peculiar configuration which I give to the ring segments.

The various features of novelty which characterize my invention are pointed out with particularity in the claims annexed to and forming a part of this specification. For a better understanding of the invention, however, and the advantages possessed by it, reference may be had to the accompanying drawings and descriptive matter, in which I have illustrated and described one of the forms in which the invention may be embodied.

Of the drawings: Figure 1 is a sectional elevation of an assembled rod packing with the rod in place. Fig. 2 is an end elevation of my novel two-part packing ring. Fig. 3 is a section taken on the line 3—3 of Fig. 2. Fig. 4 is a view similar to Fig. 2 showing the manner in which the ring contracts to compensate for wear; and Fig. 5 is a perspective view showing the manner of assembling and disassembling the ring on the rod.

In the drawings, A represents the rod to be packed, which may be the piston rod of a locomotive or the like, and B the wall, as the head of a steam cylinder, or rather the body of a stuffing box formed or otherwise secured to said cylinder head, through the passage $B^1$ in which the rod passes.

In the construction shown in Fig. 1, the cylinder chamber is at the right hand side of the wall B. Against the left hand side of the wall B is secured gland C of the stuffing box. Within the stuffing box and surrounding the rod is located a spring D, a follower E, a packing ring F and a washer G. As shown, the spring D bears at one end against the shoulder $B^2$ formed adjacent the right hand side of the wall B. The other end of the spring bears against the end of the follower E. The latter in turn holds the packing ring F against the washer G which bears against the end $C^1$ of the gland C. The gland C may be secured in place against the wall B by the usual means (not shown). A tight joint between the wall B and gland C is secured by means of a sealed wire H.

As shown best in Figs. 2, 3 and 5, the packing ring F is made up of two small parts $f$, $f^1$, each of which has two tapered ends, one $f^2$ with a convex end surface $f^3$ and the other $f^4$ with a concave end surface $f^5$. When assembled, the end $f^2$ of each segment lies under, and the end $f^4$ lies over the ends $f^4$ and $f^2$, respectively, of the other segment. The convex end surface of each segment when assembled bears against the concave end surface $f^5$ of the other segment. The ring as a whole has a conical end, the outer conical surface $f^6$ of which bears against the wall $E^1$ of the conical opening or socket formed in the follower E.

With the construction shown, it is apparent that when the ring F surrounds a rod of a diameter not greatly different from the normal internal diameter of the ring, the segments cannot be moved laterally off the ring because of the interlocking between the two segments and the rod. The concave and convex end surfaces, however, are parallel to the axis of the rod so that the segments may be readily separated by moving one segment relative to the other in a direction parallel to the axis of the rod in the manner shown clearly in Fig. 5. At the same time the ring as a whole is free to contract as shown in Fig. 4. While theoretically the surfaces $f^3$ and $f^5$ separate as illustrated in Fig. 4 when the ring contracts, it will be understood that in practice the construction of the ring is of such limited extent and takes place in such manner, as the rod and rings wear away, that the soft metal (Babbitt metal or the like) out of which the rings are formed permits the tapered ends to be deformed by the pressure on them sufficiently so that the adjacent surfaces $f^3$ and $f^5$ remain in contact from the inner surface of the ring to its periphery.

In practice, I make the two segments $f$, $f^1$ alike and make the surfaces $f^3$ and $f^5$ cylindrical about axes $f^7$ and $f^8$ parallel to but laterally displaced from the axis of the ring proper, as shown in Fig. 2. It will be understood, however, that the two segments need not be exactly alike and that the surfaces $f^3$ and $f^5$ need not be co-incident with the surfaces of cylinders of circular cross-section. These surfaces must, however, be of sufficient capacity and convexity and so disposed as to permit the proper contraction of the ring, while at the same time the segments are effectively locked together when assembled on the rod. At the same time, each segment must not have its rod engaging surface so great or its overlying part $f^4$ so shaped that the segment cannot be moved laterally over the rod to be packed. This means that each segment must not engage the rod over an arc of more than 180 degrees and that its overlying end $f^4$ must not project into a circle ($f^9$ in Fig. 2) having a radius equal to the maximum diameter of the rod to be packed and struck from the tip of the end $f^2$ of the segment. In the construction shown, the ring and segments are not only compressed about the rod by the spring pressed follower E, but also by the fluid pressure which passes freely into the gland from the chamber at the right hand side of the wall B and bears against the outer surface of the ring. The fluid pressure also acts with the spring in holding the packing ring against the washer G and the latter against the end $C^1$ of the gland.

The follower E and washer G should be of only slightly greater diameter than the external diameter of the rod in order to prevent the soft metal of the ring F from being squeezed up between the rod and the washer or follower. Where, as shown, the rod A is enlarged without the stuffing box, as at $A^1$, I prefer to make the washer G of an outer unbroken annular portion and an inner annular portion $G^1$ formed of two or more segments having abutting joints as shown at $G^3$. As shown, the inner surface $G^2$ of the outer portion of the washer G is conical and the outer surface of the segments is shaped accordingly. The internal diameter of the outer portion of the washer is great enough to pass through the portion $A^1$ of the rod. Similarly the follower E comprises an inner portion $E^2$, made up of segments which abut together as shown at $E^3$.

The packing ring as a whole is characterized by its simplicity, compactness, reliability and efficiency. Owing to the interlocking relation between the segments of the packing ring proper, the ring can be assembled on the rod quickly and easily. It will be understood that this is a very important feature when account is taken of the fact that in practice it is necessary to put the packing ring in place and to disassemble it in crowded quarters and that the rod to be packed is frequently entirely too hot to be touched by the hand without injury. In assembling the ring, as is indicated in Fig. 5, all that is necessary is to lay one segment on the rod, place the other segment in position against the rod but displaced endwise from the first segment and then move one segment along the rod relative to the other. This takes practically no time at all and does not require the operator to touch the hot rod. When the gland of the stuffing box is thereafter drawn into place against the wall B all the parts move automatically into the proper relative position.

Having now described my invention, what I claim as new, and desire to secure by Letters Patent is:

1. A rod packing ring of soft metal divided into two segments, each of which may be moved laterally over the rod to be packed and each having tapered ends, one with a convex end surface adapted to lie under, and the other with a concave end surface adapted to lie over the corresponding tapered ends of the other segment, said concave and convex surfaces being parallel to the axis of the ring and so disposed that, when assembled on the rod, the segments interlock with each other and the rod to prevent either segment from being moved laterally away from the rod while the segments may be readily moved together or separated by moving one segment relative to the other in a direction parallel to the axis of the rod.

2. A rod packing ring comprising in combination with the rod and the stuffing box through which the rod passes, said stuffing box being closed at one end and open at the other, a washer, a packing ring composed of interlocking segments and formed with a conical end, a follower formed with a conical bearing for the conical end of the packing ring, said washer, ring, and follower being arranged within the stuffing box and extending in the order named away from the closed end of the stuffing box, and a spring extending between the follower and the stuffing box and tending to move the follower, ring and washer toward the closed end of the stuffing box.

CHAS. W. G. KING.

Witnesses:
ARNOLD KATZ,
D. STEWART.

DISCLAIMER.

914,426.—*Charles W. G. King*, Philadelphia, Pa. METALLIC ROD-PACKING RING. Patent dated March 9, 1909. Disclaimer filed November 19, 1912, by the assignee, *The United States Metallic Packing Company*.

Enters this disclaimer—

"To that part of the claim in said specification, being the second numbered claim in said specification, which is in the following words, to wit:

"2. A rod packing ring comprising in combination with the rod and the stuffing box through which the rod passes, said stuffing box being closed at one end and open at the other, a washer, a packing ring composed of interlocking segments and formed with a conical end, a follower formed with a conical bearing for the conical end of the packing ring, said washer, ring, and follower being arranged within the stuffing box and extending in the order named away from the closed end of the stuffing box, and a spring extending between the follower and the stuffing box and tending to move the follower, ring and washer toward the closed end of the stuffing box."

[*Official Gazette, November 26, 1912.*]

It is hereby certified that the name of the grantee in Letters Patent No. 914,426, granted March 9, 1909, upon the application of Charles W. G. King, of Philadelphia, Pennsylvania, for an improvement in "Metallic Rod-Packing Rings," was erroneously written and printed "United States Metallic Packing Company, of Camden, New Jersey, a corporation of New Jersey," whereas said name should have been written and printed *The United States Metallic Packing Company, of Philadelphia, Pennsylvania, a corporation of Pennsylvania;* and that the proper corrections have been made in the files and records of this office, and are hereby made in said Letters Patent.

Signed and sealed this 13th day of June, A. D., 1913.

[SEAL.]

C. C. BILLINGS,
*Acting Commissioner of Patents.* other, a washer, a packing ring composed of interlocking segments and formed with a conical end, a follower formed with a conical bearing for the conical end of the packing ring, said washer, ring, and follower being arranged within the stuffing box and extending in the order named away from the closed end of the stuffing box, and a spring extending between the follower and the stuffing box and tending to move the follower, ring and washer toward the closed end of the stuffing box.

CHAS. W. G. KING.

Witnesses:
ARNOLD KATZ,
D. STEWART.

DISCLAIMER.

914,426.—*Charles W. G. King*, Philadelphia, Pa. METALLIC ROD-PACKING RING. Patent dated March 9, 1909. Disclaimer filed November 19, 1912, by the assignee, *The United States Metallic Packing Company*.

Enters this disclaimer—

"To that part of the claim in said specification, being the second numbered claim in said specification, which is in the following words, to wit:

"2. A rod packing ring comprising in combination with the rod and the stuffing box through which the rod passes, said stuffing box being closed at one end and open at the other, a washer, a packing ring composed of interlocking segments and formed with a conical end, a follower formed with a conical bearing for the conical end of the packing ring, said washer, ring, and follower being arranged within the stuffing box and extending in the order named away from the closed end of the stuffing box, and a spring extending between the follower and the stuffing box and tending to move the follower, ring and washer toward the closed end of the stuffing box."

[*Official Gazette, November 26, 1912.*]

It is hereby certified that the name of the grantee in Letters Patent No. 914,426, granted March 9, 1909, upon the application of Charles W. G. King, of Philadelphia, Pennsylvania, for an improvement in "Metallic Rod-Packing Rings," was erroneously written and printed "United States Metallic Packing Company, of Camden, New Jersey, a corporation of New Jersey," whereas said name should have been written and printed *The United States Metallic Packing Company, of Philadelphia, Pennsylvania, a corporation of Pennsylvania;* and that the proper corrections have been made in the files and records of this office, and are hereby made in said Letters Patent.

Signed and sealed this 13th day of June, A. D., 1913.

[SEAL.]

C. C. BILLINGS,
*Acting Commissioner of Patents.*

DISCLAIMER.

914,426.—*Charles W. G. King*, Philadelphia, Pa. METALLIC ROD-PACKING RING. Patent dated March 9, 1909. Disclaimer filed November 19, 1912, by the assignee, *The United States Metallic Packing Company*.

Enters this disclaimer—

"To that part of the claim in said specification, being the second numbered claim in said specification, which is in the following words, to wit:

"2. A rod packing ring comprising in combination with the rod and the stuffing box through which the rod passes, said stuffing box being closed at one end and open at the other, a washer, a packing ring composed of interlocking segments and formed with a conical end, a follower formed with a conical bearing for the conical end of the packing ring, said washer, ring, and follower being arranged within the stuffing box and extending in the order named away from the closed end of the stuffing box, and a spring extending between the follower and the stuffing box and tending to move the follower, ring and washer toward the closed end of the stuffing box."

[*Official Gazette, November 26, 1912.*]

It is hereby certified that the name of the grantee in Letters Patent No. 914,426, granted March 9, 1909, upon the application of Charles W. G. King, of Philadelphia, Pennsylvania, for an improvement in "Metallic Rod-Packing Rings," was erroneously written and printed "United States Metallic Packing Company, of Camden, New Jersey, a corporation of New Jersey," whereas said name should have been written and printed *The United States Metallic Packing Company, of Philadelphia, Pennsylvania, a corporation of Pennsylvania;* and that the proper corrections have been made in the files and records of this office, and are hereby made in said Letters Patent.

Signed and sealed this 13th day of June, A. D., 1913.

[SEAL.]

C. C. BILLINGS,
*Acting Commissioner of Patents.*